(12) United States Patent
Ranganathan et al.

(10) Patent No.: US 8,856,060 B2
(45) Date of Patent: Oct. 7, 2014

(54) CREATING STREAM PROCESSING FLOWS FROM SETS OF RULES

(75) Inventors: Anand Ranganathan, Stamford, CT (US); Anton V. Riabov, Ossining, NY (US); Octavian Udrea, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 13/043,844

(22) Filed: Mar. 9, 2011

(65) Prior Publication Data

US 2014/0081896 A1 Mar. 20, 2014

(51) Int. Cl.
*G06N 5/02* (2006.01)
(52) U.S. Cl.
CPC . *G06N 5/025* (2013.01); *G06N 5/02* (2013.01)
USPC .......................................................... 706/48
(58) Field of Classification Search
CPC ....................................................... G06N 5/047
USPC .......................................................... 706/48
See application file for complete search history.

(56) References Cited

U.S. PATENT DOCUMENTS

| | | | |
|---|---|---|---|
| 6,993,745 B1 * | 1/2006 | Ballantyne et al. | 717/109 |
| 7,441,230 B2 | 10/2008 | Kainz et al. | |
| 2006/0191008 A1 | 8/2006 | Fernando et al. | |
| 2008/0133891 A1 | 6/2008 | Salz et al. | |
| 2008/0147881 A1 | 6/2008 | Krishnamurthy et al. | |
| 2009/0063515 A1 | 3/2009 | Bar-Or et al. | |
| 2009/0313614 A1 | 12/2009 | Andrade et al. | |
| 2009/0319687 A1 | 12/2009 | Goldstein et al. | |
| 2010/0088490 A1 | 4/2010 | Chakradhar et al. | |
| 2010/0106946 A1 | 4/2010 | Imaki et al. | |
| 2010/0138698 A1 | 6/2010 | Angele et al. | |

OTHER PUBLICATIONS

Albers et al. Hierarchical Event Streams and Event Dependency Graphs: A New Computational Model for Embedded Real-Time Systems, Proceedings of the 18th Euromicro Conference on Real-Time System (ECRTS'06) pp. 1-10.
Schneider et al. Elastic Scaling of Data Parallel Operators in Stream Processing, 2009 IEEE, pp. 1-12.
IBM, jRules, http://www-01.ibm.com/software/integration/business-rule-management/jrules/#, pp. 1-3, accessed Jun. 9, 2011.
Wikipedia, Drools, http://en.wikipedia.org/wiki/Drools, pp. 1-4, accessed Jun. 9, 2011.
Wikipedia, Datalog, http://en.wikipedia.org/wiki/Datalog, pp. 1-3, accessed Jun. 9, 2011.
Wikipedia, Distributed RETE, http://en.wikipedia.org/wiki/Rete_algorithm, pp. 1-10, accessed Jun. 9, 2011.

* cited by examiner

*Primary Examiner* — Jeffrey A Gaffin
*Assistant Examiner* — Ola Olude Afolabi
(74) *Attorney, Agent, or Firm* — Ryan, Mason & Lewis, LLP

(57) ABSTRACT

Techniques for creating a distributed application flow from a set of rules are provided. The techniques include creating a control-flow graph for each rule, creating one or more dependency links between two or more rules, partitioning a resulting graph, wherein the resulting graph comprises one or more control-flow graphs and one or more dependency links, into one or more operators by determining an optimal set of one or more cuts through the resulting graph such that a cost function is minimized, and generating stream processing flow code from the partitioned graph.

22 Claims, 10 Drawing Sheets

CREATING STREAM PROCESSING FLOWS FROM SETS OF RULES

GOVERNMENT CONTRACT

This invention was made with Government support under Contract No.: H98230-07-C-0383 awarded by the United States Department of Defense. The Government has certain rights in this invention.

FIELD OF THE INVENTION

Embodiments of the invention generally relate to information technology, and, more particularly, to rules engines.

BACKGROUND OF THE INVENTION

In existing approaches, rules engines use shared memory architecture to process rules. Facts are asserted in the shared memory, causing the rule engine to re-compute the set of active rules, out of which one or more rules are executed at any given time, modifying the set of facts in the shared memory, thus causing the set of active rules to be recomputed, and so on.

Rule-based specification, found both in Rule Management and Complex Event Processing systems, offer a way for enterprise experts and analysts, as well as technical developers and architects to express enterprise logic and implement decision-based services with tools designed for both technical and non-technical users. However, a drawback of existing rule engine architectures includes the fact that using shared memory makes parallelization of enterprise logic expressed as sets of rules very difficult. In existing approaches, using shared memory makes the parallelization process cumbersome to implement, and reduces the utility of adding more resources (machines, memory, etc.) beyond a certain point. This, consequently, decreases the potential scalability of such systems.

SUMMARY OF THE INVENTION

Principles and embodiments of the invention provide techniques for creating stream processing flows from sets of rules. An exemplary method (which may be computer-implemented) for creating a distributed application flow from a set of rules, according to one aspect of the invention, can include steps of creating a control-flow graph for each rule, creating one or more dependency links between two or more rules, partitioning a resulting graph, wherein the resulting graph comprises one or more control-flow graphs and one or more dependency links, into one or more operators by determining an optimal set of one or more cuts through the resulting graph such that a cost function is minimized, and generating stream processing flow code from the partitioned graph.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
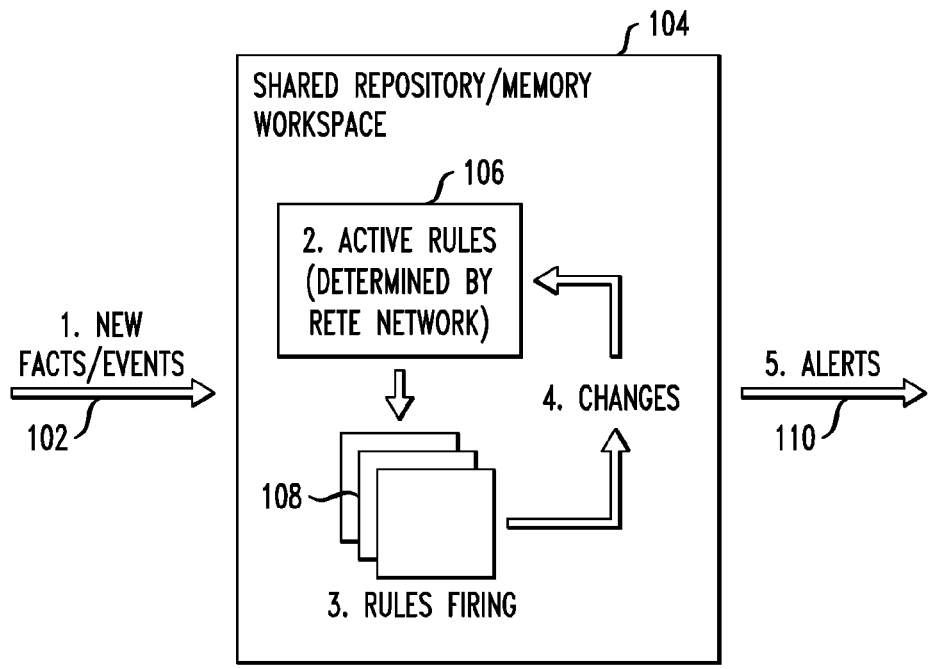
FIG. 1 is a diagram illustrating a traditional rule-based system.

Principles of the invention include creating stream processing flows from sets of rules. As detailed herein, a rules engine is a software system that executes one or more enterprise rules in a run-time production environment. One or more embodiments of the invention includes executing rules as a stream processing graph (such as may be executed, for example, on IBM's InfoSphere Streams stream processing middleware using the stream processing language (SPL), in which applications are written as operators).

Additionally, one or more embodiments of the invention include running a set of rules as a distributed program (that is, sent to different boxes and/or machines). Additionally, as used herein, "stateless" rules refer to rules that do not use information from the past, while "stateful" rules refer to rules that do use information from the past in determining what to do in a present scenario.

As detailed herein, rules can be implemented in policy enforcement scenarios, can be readable (and editable) by non-technical people, and can provide accessible semantics. With rules and stream processing, one or more embodiments of the invention can provide performance and scalability of distributed stream processing (for example, on the IBM InfoSphere Streams platform), an ability to integrate complex real-time analytics, as well as an intuitive way to program and interpret applications. Additionally, the techniques described herein can maintain the expressive and accessible programming model of rules and take advantage of the natural parallelization and low latency/high throughput of streaming applications.

In executing enterprise logic expressed as rules under the form of a stream processing graph, one or more embodiments of the invention include provide the ability to scale up the ability to execute rules, both in terms of resource usage and in terms of data rates, without special changes to the middleware.

By way of example, one or more embodiments of the invention can include authoring a set of rules implementing an application's enterprise logic and/or decision services, executing (for example, automatically) a system to analyze and optimize the rules and transform them to a stream processing graph (for instance, on IBM InfoSphere Streams), as well as executing the set of rules as a streaming application while still being able to manage the rules.

Given a set of rules, one or more embodiments of the invention can include the following steps. Rules are analyzed and a dependency graph of computation operators is extracted. The operator graph is optimized for cost, throughput, latency, computational and memory requirements, or any combination thereof. The optimization process is performed by partitioning the operator graph into sub-graphs and choosing the partitioning that is cost-optimal from the point of view of the previously stated criteria. Also, a stream processing flow is generated (for example, in the SPL language) from the optimized graph.

Accordingly, one or more embodiments of the invention provide the ability to seamlessly integrate rule specifications with complex streaming operators (for example, data mining and machine learning operators), as well as to take advantage of inherent scalability and parallelization capabilities of the underlying stream processing platform.

Further, one or more embodiments of the invention include creating distributed application flows from sets of rules, creating a dependency and control-flow graph from a set of rules, optimally partitioning a dependency and control-flow graph derived from a set of rules into a distributed set of operators based on a cost function.

FIG. 1 is a diagram illustrating a traditional rule-based system. By way of illustration, FIG. 1 depicts new facts and/or events 102, a shared repository/memory workspace 104, a set of determined active rules 106, a rules firing component 108 to implement changes, and generated alerts 110. Issues existing in traditional rule-based systems such as depicted in FIG. 1 include a requirement for large amounts of shared memory, and rule activation algorithms (for example, RETE) designed to merely allow one set of updates to working memory to be processed at a time. As a result, such traditional systems are difficult to parallelize and/or distribute, leading to higher latencies and lower throughput.

Figure 2:
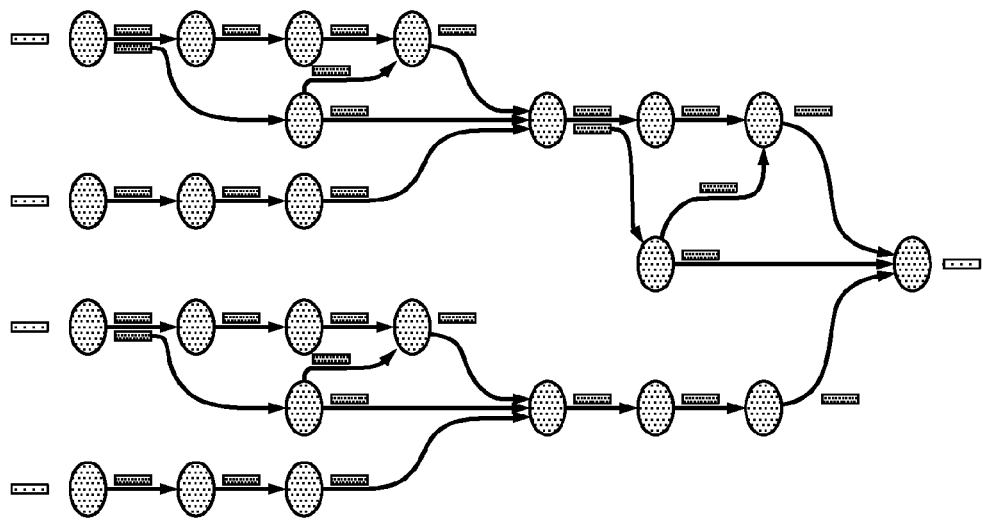
FIG. 2 is a diagram illustrating example streaming applications, according to an embodiment of the present invention.

FIG. 2 is a diagram illustrating example streaming applications, according to an embodiment of the present invention. By way of illustration, example streaming applications can include natural parallelization of computation (each operator/group of operators) executing separately, and multiple data tuples being processed in the system at the same time. Also, example streaming applications can include existing infrastructure to dynamically map and adapt to hardware.

As detailed herein, by way of example, several language constructs are used for illustration that are typical in most rule languages (commercial or not), such as the ILog Rule Language (IRL), CLIPS, Drools, WebSphere Business Events, etc. Note that one or more embodiments of the invention are independent of the language in which a rule specification is described, provided it uses a subset of the following constructs:

Creation of a new object can be written as X:=new ObjectType(arguments), where the arguments can include any list of constants and/or variables supported by the object type. For example: M:=new Person ("Michael," 23).

Simple statements include variable assignments and function and method calls, as in any typical programming language. Examples can include: X:=Y+2; or TempF:=TempC*9/5+32; or Car:=Michael.getCar( )

Shared memory operations include:

Insertion of an object into shared memory (also referred to as assertion in some rule languages): assert X;

Deletion of an object from shared memory: delete X;

Updating an object into shared memory after a modification. For example: X.raiseSalary(1000); update X;

Matching against an object from shared memory and binding the result to a variable. For example: ?x: Person (age>21, name.startsWith("M")); Note that this construct will match each object matching the conditions, one at a time. That is, a rule with such a condition will execute, however a number of times equal to the number of objects matching this condition there exist in shared memory.

Creating a collection of all matching objects from shared memory. For example: ?x: collect Person(age>21, name.startsWith("M")). Note that this construct will collect all objects matching the specified condition in one pass into the variable ?x. A rule containing this condition will execute only once (assuming the persons in shared memory are not changed by external factors or other rules).

As detailed herein, one or more embodiments of the invention include the following steps. A control-flow graph is created for each rule. Dependency links are created between rules. Code can be analyzed to make inherent dependencies explicit. Dependency links for stateful rules, for example, can be based on pairing an assert/retract/update in rule A with match or collect-match statements in rule B (B depends on A). Dependency links for stateless rules, for example, can be based on pairing variables set by rule A and used (in conditions, expressions) by rule B (B depends on A).

As further detailed herein, optimizations can be performed on the resulting graph (for example, to combine any redundancies). Optimizing can include, by way of example, live variable analysis, constant folding, as well as detecting and (possibly, according to heuristics) merging identical statements on different branches that are not in an ancestor-descendant relation. Also, the resulting graph can be partitioned into operators by determining the optimal set of cuts through the graph such that the cost function is minimized. Accordingly, stream code can be generated.

Figure 3:
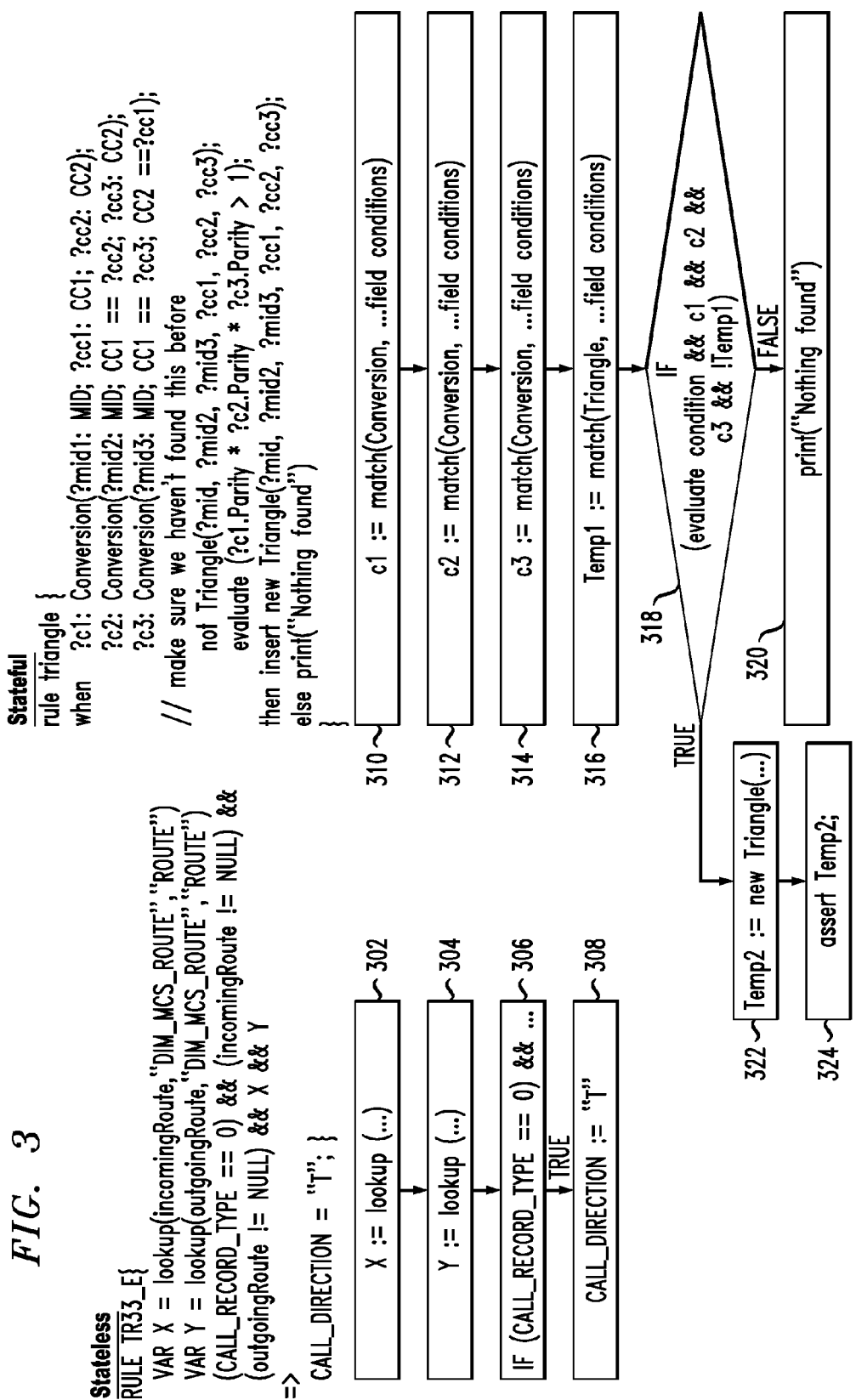
FIG. 3 is a diagram illustrating creation of a control flow for a rule, according to an embodiment of the present invention.

FIG. 3 is a diagram illustrating creation of a control flow for a rule, according to an embodiment of the present invention. By way of illustration, FIG. 3 depicts flow components 302, 304, 306 and 308 for the noted stateless rule, as well as flow components 310, 312, 314, 316, 318, 320, 322 and 324 for the noted stateful rule. A control flow graph is a graph data structure where each node is a simple statement in the underlying program and the edges represent possible succession of statements in an execution of a program. Control-flow graphs are data structures widely used by optimizing compilers to perform static analysis of programs for the purposes of validation of logical properties (for example, the absence of a deadlock) or for the purposes of optimization.

Figure 4:
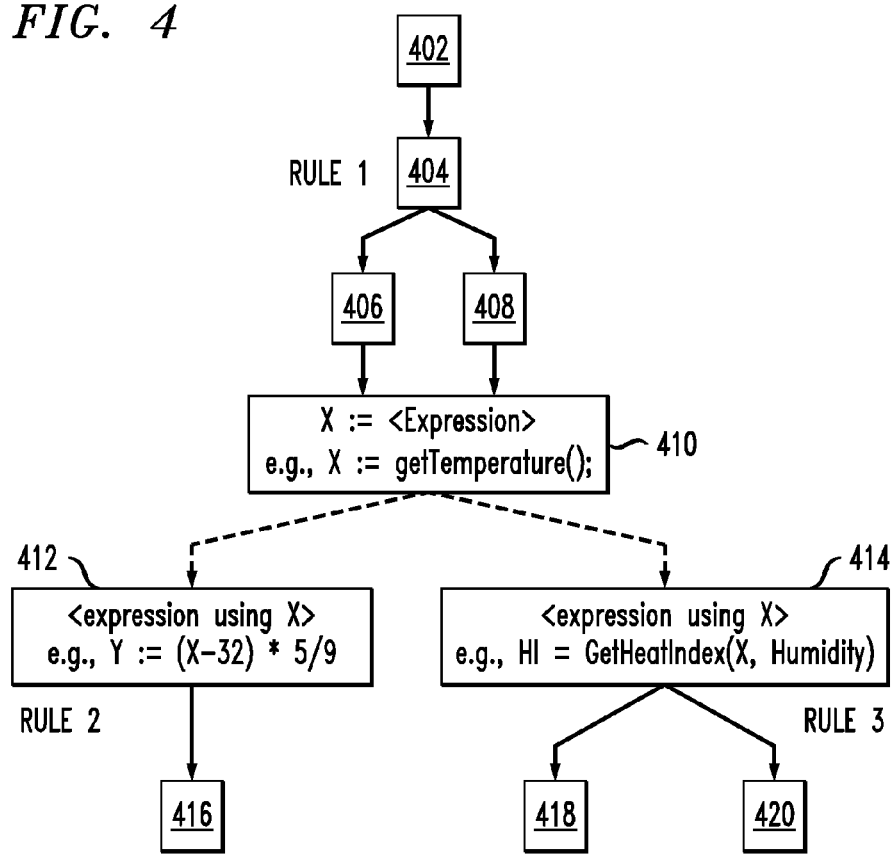
FIG. 4 is a diagram illustrating creation of dependency links between rule control-flow graphs (CFGs) for stateless rules, according to an embodiment of the present invention.

FIG. 4 is a diagram illustrating creation of dependency links between rule control-flow graphs (CFGs) for stateless rules, according to an embodiment of the present invention. By way of illustration, FIG. 4 depicts statements 402, 404, 406, 408 and 410 for a first rule, statements 412 and 416 for a second rule, and statements 414, 418 and 420 for a third rule. All boxes in the figures herein containing CFGs stand for one statement in one rule (by the way of the example in FIG. 3, a box in FIG. 3 is the same as a small box in FIGS. 4-9).

For stateless rules, rule B depends on rule A iff B uses (but does not set) a variable that A sets, and B uses a variable that A sets (but does not use). In other words, if B uses something that A sets, then B depends on A. The dashed edges are drawn in the graph between the block that sets a variable (for example, variable X). In FIG. 4, this includes statement 410 to all statements in other rules (in FIG. 4, statements 412 and 414) that use the same variable (for example, X). Based on the definition detailed herein of a dependency for stateless rules, it is desirable to avoid cases such as, for example, the following:

```
RULE A {
IF
    .... use variable X
THEN
    .... set variable X
}
RULE B {
IF
    .... use variable X
THEN
    .... set variable X
}
```

Therefore, for stateless rules, there are no dependency-induced cycles in the rules (a cycle indicates something is wrong with the rule specification). As a side effect, this implies that there exists at least one topological sort of the resulting graph.

Figure 5:
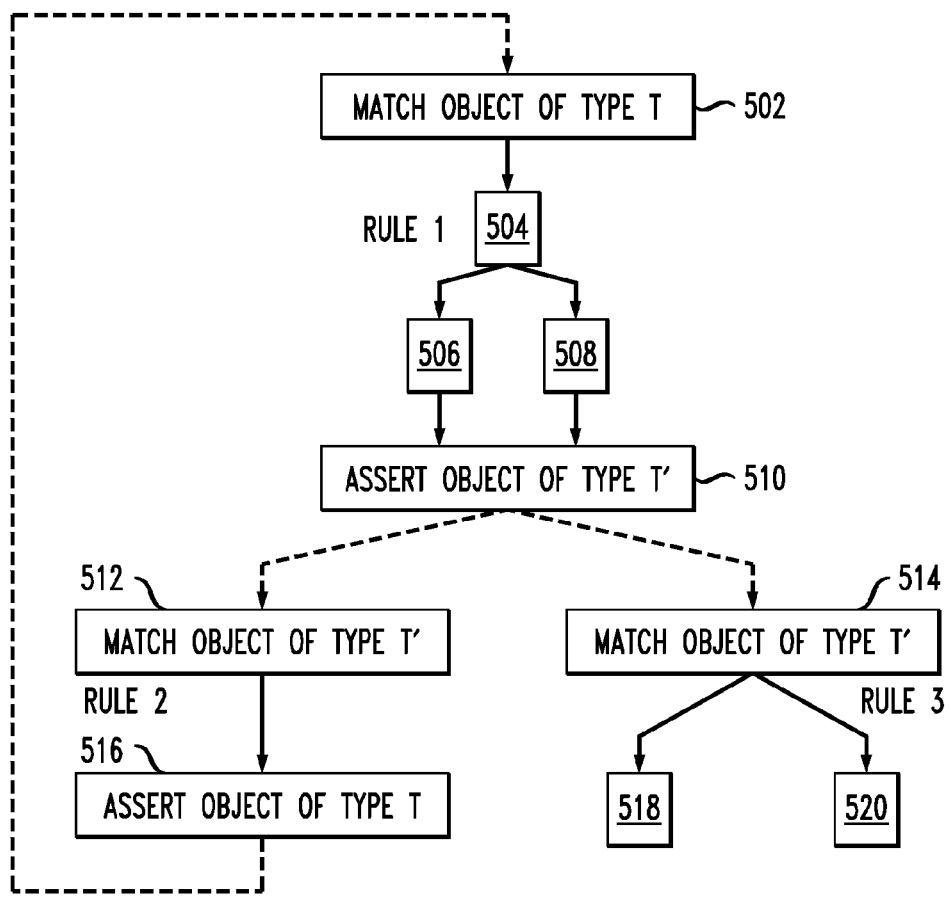
FIG. 5 is a diagram illustrating creation of dependency links between rule CFGs for stateful rules, according to an embodiment of the present invention.

FIG. 5 is a diagram illustrating creation of dependency links between rule CFGs for stateful rules, according to an embodiment of the present invention. By way of illustration, FIG. 5 depicts statements 502 (match object of type T), 504, 506, 508 and 510 (assert object of type T') for a first rule, statements 512 (match object of type T') and 516 (assert object of type T) for a second rule, and statements 514 (match object of type T'), 518 and 520 for a third rule.

In FIG. 5, solid lines represent CFG edges within an individual rule, while dashed edges represent dependencies computed between rules as follows. Dependency links are created based on pairing match/collection-match with assert/retract/update statements. By way of example, consider, for purposes of illustration, the following method: if rule A asserts/retracts/updates an object of type T and rule B matches against something of type T, B depends on A. To make the example more concrete, assume rule A asserts an object of type Person. Then, any rule B that matches (using the match or match-collect constructs) against objects of type Person may be dependent on rule A. This is illustrated in FIG. 5, where statements 512 and 514 depend on 510, and statement 502 depends on statement 516. Note that dependency links are created in a conservative manner; that is, if there is reason to believe that there may be a dependency between of rule B on rule A, then it is assumed that there is a dependency link of B on A. This approach does not affect the correctness of the translation and optimization method described by one or more embodiments of the invention, but it can have an effect on the performance of the resulting stream processing application. For this purpose, one or more embodiments of the invention attempt to eliminate as many false positive dependencies as possible. As an example, if rule A asserts objects of type Person with an age that is always greater than 50, and rule B matches only against objects of type Person that always have age that is less than or equal to 21, then B does not truly depend on A; that is, no object that is ever asserted by A will ever be used by B.

One or more embodiments of the invention can eliminate some such dependencies using techniques based on static analysis of the program code that can be potentially combined with theorem proving techniques. For instance, one or more embodiments of to the invention can include using static analysis to compute the set of facts known about an attribute of an object in shared memory (for instance, all facts about the age of a Person asserted/updated), and attempt to prove that those facts are mutually exclusive with the condition of another rule matching against objects of the same type (for example, age>50 and age<=21 are mutually exclusive).

Note also that in one or more embodiments of the invention, rule specifications that contain both stateful and stateless rules are possible. In that case, dependency links are created using the techniques described for both stateless and stateful rules. It is to be appreciated, however, that these techniques are described separately herein for illustration purposes.

Figure 6:
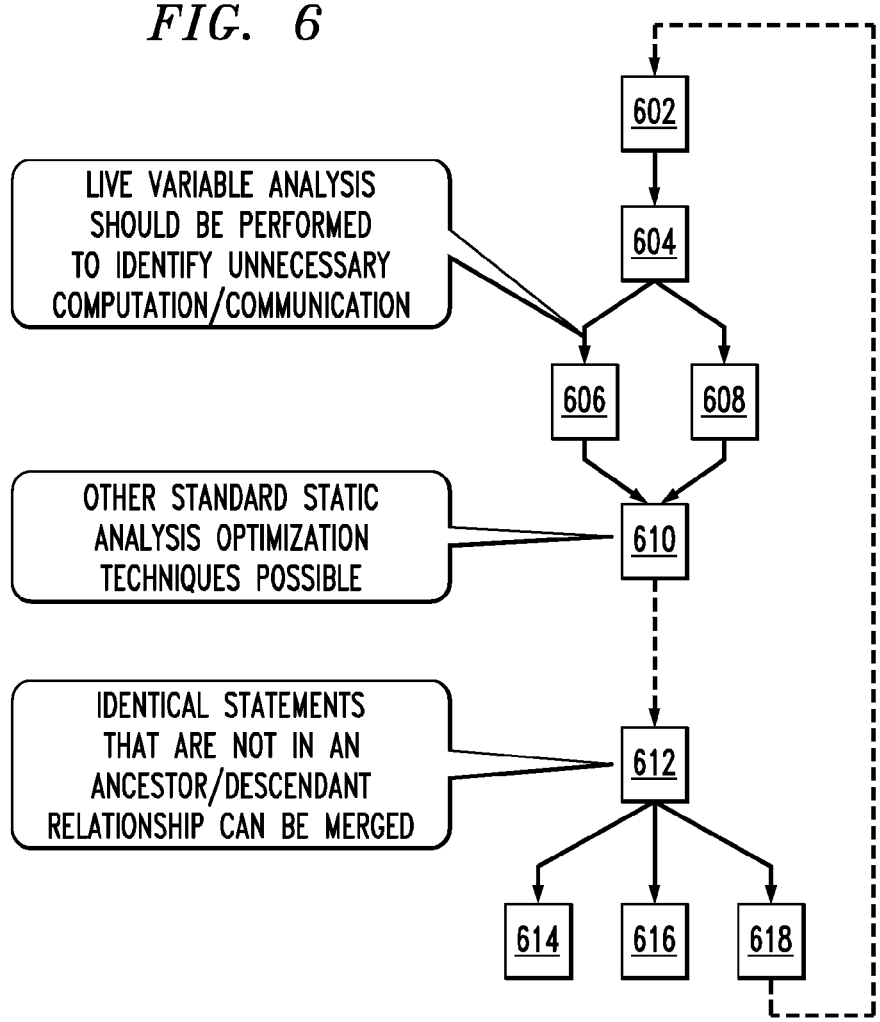
FIG. 6 is a diagram illustrating example optimizations, according to an embodiment of the present invention.

FIG. 6 is a diagram illustrating example optimizations, according to an embodiment of the present invention. By way of illustration, FIG. 6 depicts statements 602, 604, 606, 608 and 610 for a first rule, and statements 612, 614, 616 and 618 from a previous second and third rule. By way of illustration, refer to the graph obtained by linking individual rule CFGs (solid edges) via dependency links (dashed edges) as the ruleset graph. There are several optimizations that can be performed on this graph, such as, by way merely of example, the following:

If two statements that appear in two distinct nodes in the resulting graph are identical and are not in an ascendant/descendant relationship (that is, there is no path in the graph from one statement to the other), then the two nodes in the graph can be merged into a single node.

Live variable analysis is a static analysis technique that can identify which variables are "live" (that is, still needed for further computation at all points in the graph). Any statements involving variables that are not "live" can be removed.

Constant propagation is a technique used to eliminate any variables for which a constant value can be propagated from earlier statements in the graph.

Constant folding is a technique used in conjunction with constant propagation to replace expressions between constants (for example, 2+3) with their values (for example, 5).

Figure 7:
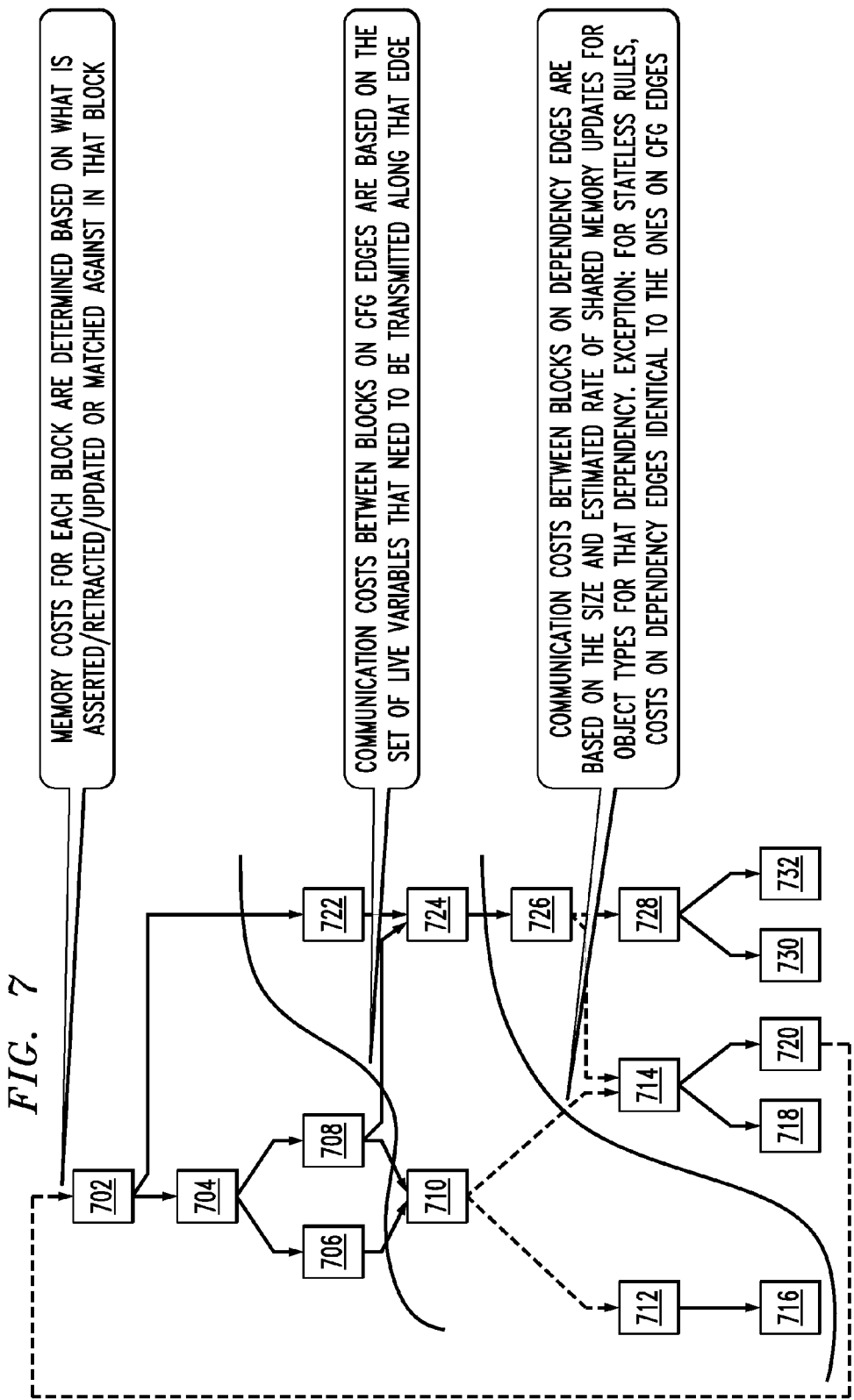
FIG. 7 is a diagram illustrating the desired result of partitioning techniques, according to an embodiment of the present invention.

FIG. 7 is a diagram illustrating the desired result of partitioning techniques, according to an embodiment of the present invention. By way of illustration, FIG. 7 depicts statements 702, 704, 706, 708 and 710 for a first rule, statements 712 and 716 for a second rule, statements 714, 718 and 720 for a third rule, and statements 722, 724, 726, 728, 730 and 732, for a fourth rule, together with the CFG and dependency edges that form a ruleset graph. The dark curved lines in FIG. 7 represent partition boundaries, as an example of what may be the result of the partitioning technique described herein. For example, in FIG. 7, there are four resulting partitions as follows: statements 702, 704, 706 and 708 are in one partition; statements 726, 728, 730, 732, 714, 718 and 720 are in a second partition; the region between the dark curved lines actually forms two partitions, as there are two disconnected graphs in that region: statements 722 and 724 form a third partition and statements 710, 712 and 716 a fourth partition. FIG. 7 also provides an outline of the techniques used to model the memory/computation and communication costs of the statements and partitions in the ruleset graph.

There are three methods that can be used to create the optimal partitioning of the ruleset graph. Before beginning the description of these methods, the methods for estimating the computational, memory and communication costs for the ruleset graph and its partitions will be described. These costs are computed according to the following rules:

The computation cost $C_{comp}$ of a single statement in the ruleset graph can be modeled in the following way, depending on user-specified options:

By default, the $C_{comp}(S)=1$ for any statement S.

The user can specify individual constant costs for different types of statements. For example, a method call can have a higher cost than an assignment of an expression to a variable.

The user has the option of specifying a cost for every statement in the set of rules (for instance, by adding comments to each statement that include the text "@cost X," where X stands for the number representing the cost).

The computation cost of a sub-graph (partition) of the ruleset graph is equal to the sum of computation costs of all statements within that partition.

The memory cost $C_{mem}$ is by definition 0 for any statement that is not a match or collect-match statement. The memory cost can be defined in one of the following ways for any other statement:

By default, the $C_{mem}(S)$ for a statement S that is a match or match-collect is equal to the maximum size, in bytes, of an instance of the type of object being matched against (for example, as it is computable for instance in C by the sizeof( . . . ) construct), multiplied by a constant, average number of objects expected to be stored $N_{objects}$.

The user can, if so desired, override the computed size or expected number of objects for any type of asserted or matched object T.

The memory cost of a sub-graph (partition) is equal to the sum of the memory costs of all statements within that partition.

The communication cost between two statements $S_1$ and $S_2$ is defined as follows:

If $S_1$ and $S_2$ are not connected, then $C_{comm}(S_1, S_2)=0$.

If $S_1$ and $S_2$ are connected with a CFG edge (a solid line in FIG. 7), then by default one or more embodiments of the invention can assign $C_{comm}(S_1, S_2)=1$. The user also has the option of using the number of live variables (if live variable analysis is performed) at S1 as the communication cost $C_{comm}(S_1, S_2)$; this signifies the fact that any partition boundary between $S_1$ and $S_2$ means that all live variables will need to be sent using a data stream.

If $S_1$ and $S_2$ are connected with a dependency link edge (dashed link in FIG. 7), then $C_{comm}(S_1, S_2)=C_{mem}(S_2)$.

It can also be assumed that the user specifies a function with three variables that can be used to compute the cost of a sub-graph (or partition) of a function of its computation, memory and communication costs: $C=F(C_{comp}, C_{mem}, C_{comm})$. For instance, if high throughput is desired, the user can assign a high component of the cost to computation and memory costs (thus maintaining each partition/operator small). If low latency is desired, then the cost C should be high when communication costs are relatively high. By way of example, assuming all costs are normalized in a [0,1] interval, $C=10*C_{comp}+10*C_{mem}+0.1*C_{comm}$ will emphasize throughput, whereas $C=C_{comp}+C_{mem}+10*C_{comm}$ would, in most cases, emphasize latency.

If the function F is linear or quadratic in all three variables, then the first method of solving the partitioning problem is to reduce it to a quadratically constrained quadratic program. First, eliminate cycles in the graph by performing a depth-first traversal of the graph and eliminating back-edges from consideration. It can be assumed that N is the number of statements in the ruleset graph. Then, there are at most N partitions that can possibly be obtained from the ruleset graph. Further, number each statement in the ruleset graph with a number between 1 and N and define the variables $X_{ij}$, $1 \leq i \leq N$, $1 \geq j \leq N$, where $X_{ij}=1$ will indicate that statement i will belong to partition j. Note that some partition indexes j may not contain any statements once the solution (that is, the values of the $X_{ij}$ variables are computed), which means that there are less than N partitions in the optimal partitioning. Accordingly, consider the following sets of equations:

(1) $\forall 1 \leq i \leq N$, $\forall 1 \leq j \leq N$, $0 \leq X_{ij} \leq 1$ indicates that any variable $X_{ij}$ can be either 0 or 1 (the solver program used must also be instructed to find only integral solutions).

(2)
$$\forall\, 1 \leq i \leq N, \sum_{j=1}^{N} X_{ij} = 1$$

indicates that each statement i will belong to exactly one partition.

(3) succ(i) denotes all statements reachable from statement i in the graph with all cycles eliminated. $\forall 1 \leq j \leq N$, $\forall 1 \leq i \leq N$, $\forall k \in succ(i)$, $\forall l \in succ(k) X_{kj} \geq X_{ij} \cdot X_{lj}$. This set of equations indicate that, if a statement S is in partition j and a successor statement Q is also in partition j, then all statements on the path between S and Q are also in partition j.

(4)
$$\forall\, 1 \leq j \leq N, \sum_{i=1}^{N} X_{ij} \cdot C_{comp}(i) \leq MC_{comp},$$

where $MC_{comp}$ is the maximum computation cost that can be assigned to any single partition. If there is no such maximum, then this set of equations is ignored.

(5)
$$\forall\, 1 \leq j \leq N, \sum_{i=1}^{N} X_{ij} \cdot C_{mem}(i) \leq MC_{mem},$$

where $MC_{mem}$ is the maximum memory cost that can be assigned to any single partition. If there is no such maximum, then this set of equations is ignored.

One or more embodiments of the invention also define the total cost of the partitioning as (6):

$$\sum_{j=1}^{N} F(\sum_{i=1}^{N} C_{comp}(i) \cdot X_{ij}, \sum_{i=1}^{N} C_{mem}(i) \cdot X_{ij},$$

$$\sum_{i=1}^{N} \sum_{k \in next(i)} (X_{ij} \cdot (1 - X_{kj}) + X_{kj} \cdot (1 - X_{ij}) \cdot C_{comm}(i, k)),$$

where next(i) is the set of statements following statement i in the ruleset graph without cycles.

Consequently, consider the problem of minimizing (6) under the constraints imposed by the sets of equations (1), (2), (3), (4), (5) (as noted above) with integral solutions to a quadratically constrained quadratic program solver such as CONOPT or CPLEX. Also, note that if the set of equations (3) is removed, then the problem becomes an integer quadratic programming problem (with linear constraints), which can be generally easier to solve. If the set of equations (3) is removed (does not affect correctness of the solution) and the function F is linear in all three variables, then the problem becomes a 0-1 integer programming problem, which can be solved by integer programming solvers as well.

The second method of solving the partitioning problem includes performing an exhaustive search for the space of all possible partitions. The algorithm is as follows:

A) Compute the set of all possible cuts through the ruleset graph (in this method, cycles have not been removed yet). The number of cuts is generally in the order of $2^N$.

B) Each graph cut divides the graph into two partitions. Two graph cuts are said to overlap if one cut creates a partition that intersects both partitions created by the second cut. For every set of cuts that do not overlap, one or more embodiments of the invention can include computing the total cost of the partitioning created by that set of cuts the using the cost function F as described above.

C) Choose the set of cuts that produces the minimum cost partitioning.

Figure 8:
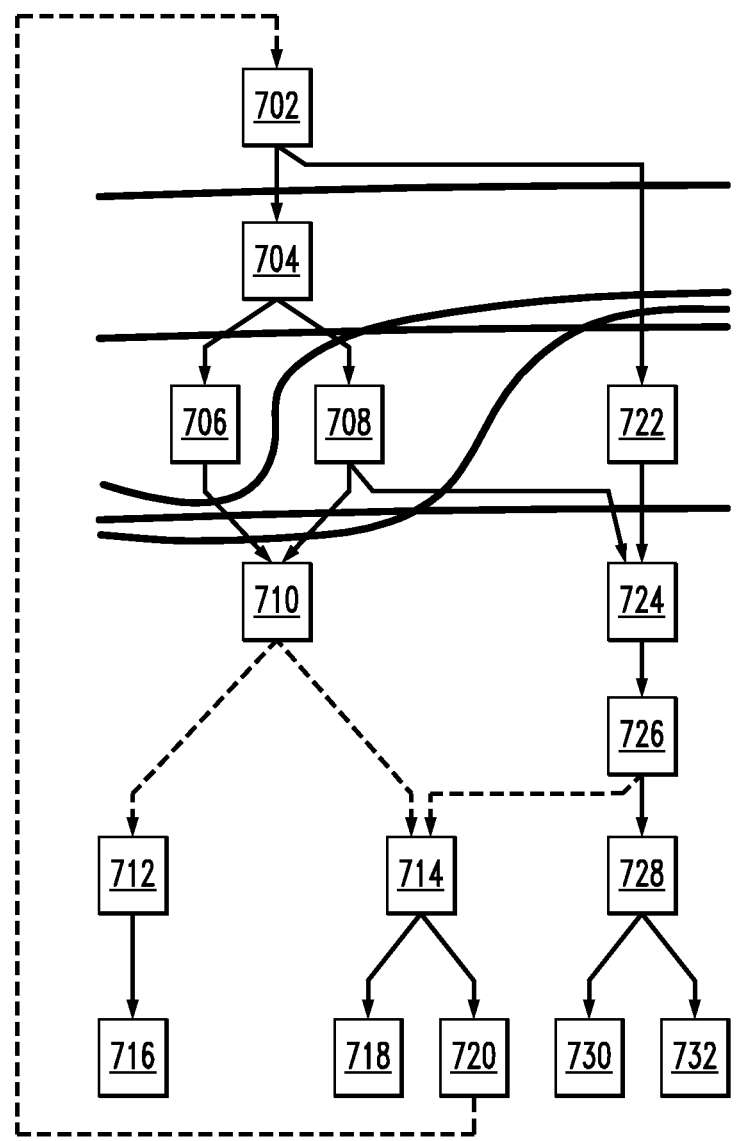
FIG. 8 is a diagram illustrating cut morphing partitioning techniques, according to an embodiment of the present invention.

The third method of solving the partitioning problem is an approximate method illustrated in FIG. 8. This figure is a diagram illustrating a process referred to herein as cut morphing, a process of advancing a graph cut incrementally, according to an embodiment of the present invention. By way of illustration, FIG. 8 depicts the same ruleset graph and the same statements that were described in FIG. 7. In addition, FIG. 8 contains several dark curved lines that represent incremental changes in the graph cut (the process referred to as "cut morphing"). The method proceeds as follows:

A) Remove all cycles in the graph by performing a depth-first traversal of the graph and removing all back-edges.

B) Create a topological sort of the ruleset graph with the cycles removed (it is a known result that each graph without cycles has at least one topological sort).

C) Iterate through the nodes in the topological sort, every time moving the cut to include all nodes seen so far. For example, in FIG. 8, the first partition of the cut starts by containing statement 702. In the next step, it will also contain statement 704, in the next step statement 706, then 708, then 722.

D) "Fix" a cut as soon as the cost of the partition in either computation or memory reaches a maximum computation constraint $MC_{comp}$ or a maximum memory constraint $MC_{mem}$ or the communication cost across the current cut becomes smaller (or larger, as the user specifies) than a given threshold; combinations of all the above conditions can also be permitted. Once a cut is fixed, continue iterating through a topological sort to determine the second cut in the partitioning.

This third method can often provide a very good approximate solution because of its low computation requirements compared to the previous two methods detailed above.

Parallelization of different branches can be costly (need for joins afterwards); instead end-to-end data parallelization can be performed in one or more embodiments of the invention, as detailed herein.

As also detailed herein, in partitioning for stateful rules, any statement X can be in only one block. If statement X and statement Y are in the same block, and X is an ancestor of Y (on CFG links), anything between X and Y has to be in the same block. Also, the number of statements in each block has to fit a minimum/maximum CPU constraint. Further, one or more embodiments of the invention include making required cuts for external operators (for example, lookups from a DB), computing memory and communication as functions of V(i, j), and minimizing COST(memory, communication) under constraints detailed herein.

Partitioning for stateful rules in an arbitrary cost function scenario can include the following steps. If COST(memory, communication) is arbitrary, then an exhaustive search and/or heuristic techniques can be used. As noted herein, in an exhaustive search, for N statements, there can be at most N+# cycles cuts, and all possible subsets of cuts are explored; that is, 2N+# cycles. Heuristic techniques can include a greedy approach using iterative morphing of a cut. This can be similar to the approach for stateless rules, but with this approach ensuring that the COST does not go up after a morph.

Figure 9:
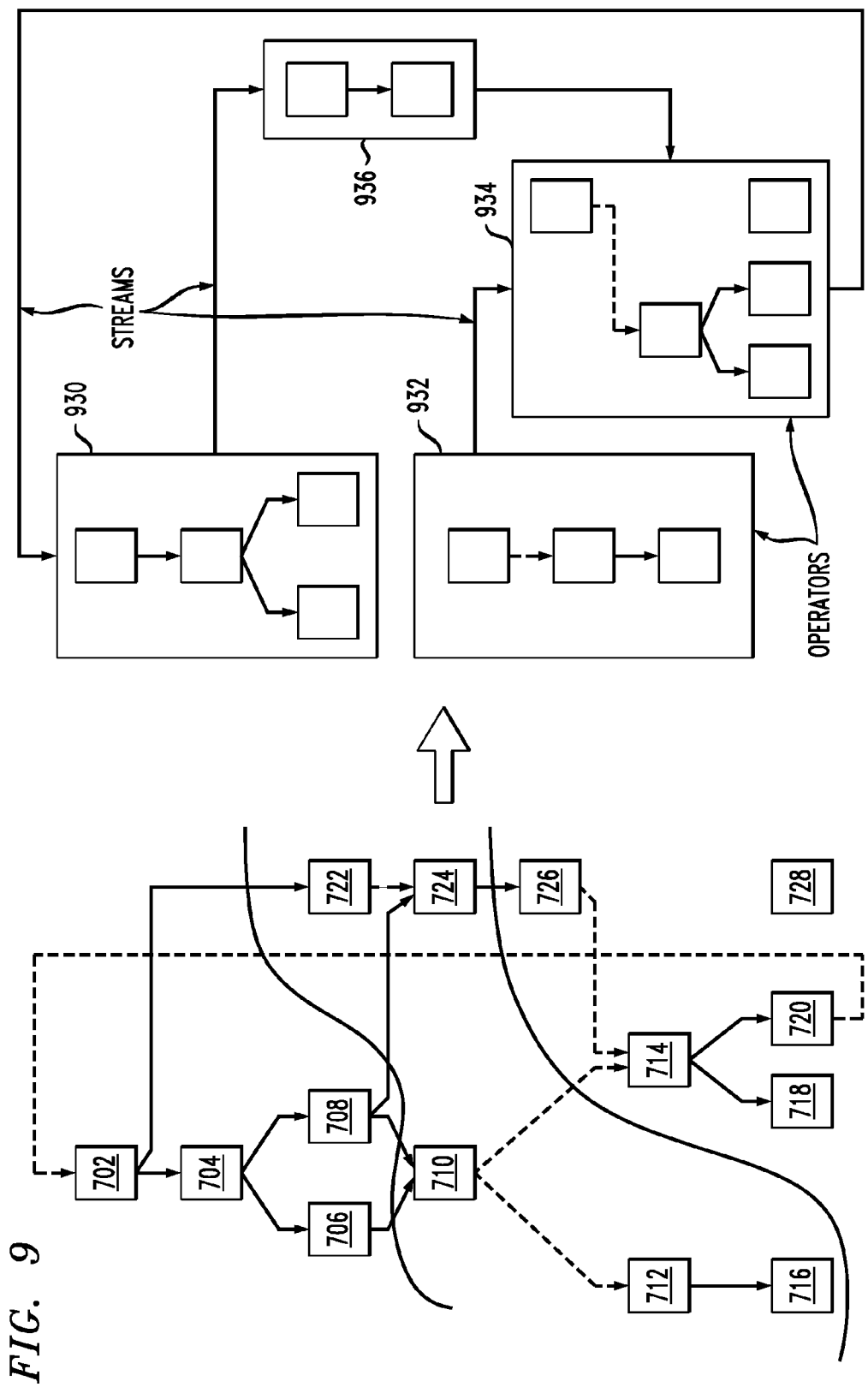
FIG. 9 is a diagram illustrating code generation techniques, according to an embodiment of the present invention.

FIG. 9 is a diagram illustrating code generation techniques, according to an embodiment of the present invention. By way of illustration, on the left side of the diagram, FIG. 9 depicts the same ruleset graph and constituent statements as FIGS. 7 and 8. FIG. 9 also illustrates an example partitioning, which could be obtained, for example, using one of the partitioning methods outlined above. On the right hand side of the diagram, FIG. 9 illustrates the mapping of the four partitions outlined in the explanation of FIG. 7 to generated stream processing operators 930, 932, 934 and 936.

Figure 10:
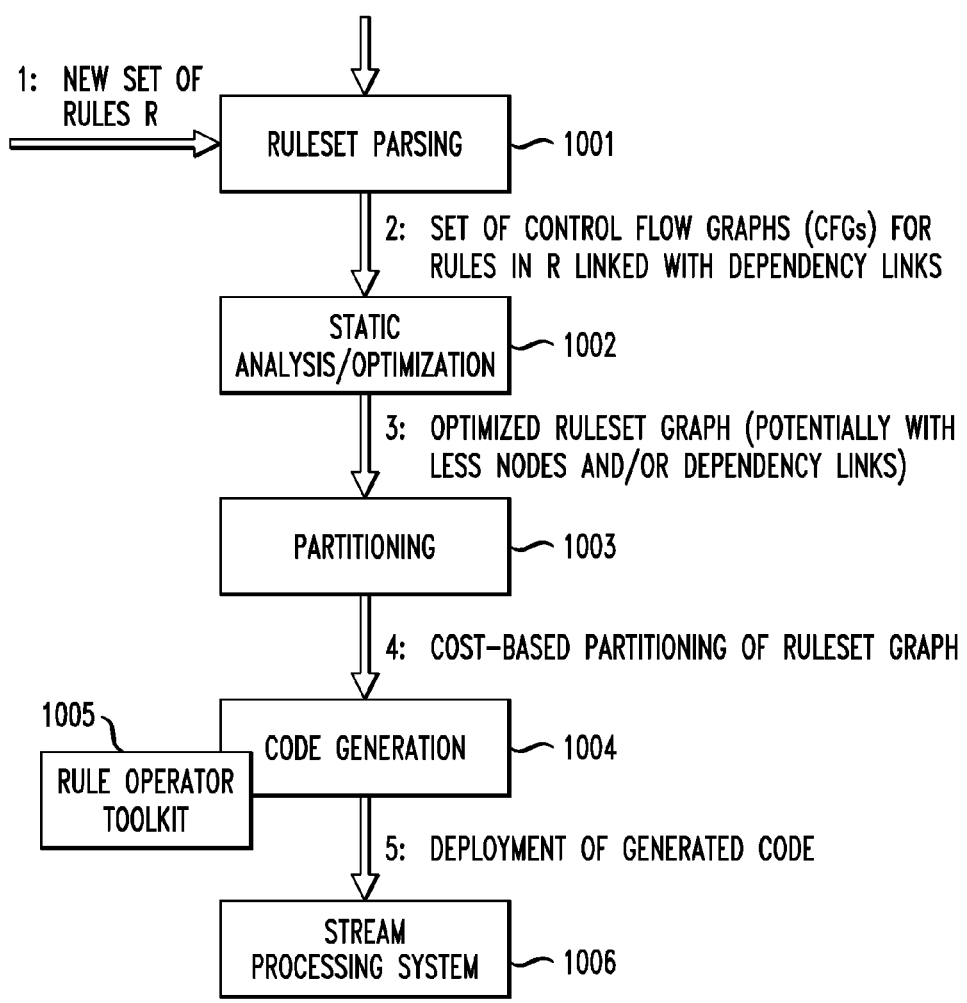
FIG. 10 is a block diagram illustrating an example embodiment, according to an aspect of the invention.

FIG. 10 is a block diagram illustrating an example embodiment, according to an aspect of the invention. The system architecture depicted in FIG. 10 includes four main modules. When a new ruleset is received, the ruleset parsing module 1001 processes the rules and creates control-flow graphs and the initial set of dependency links based on matching assert/update/retract statements with match and match-collect statements. The static analysis/optimization module 1002 performs the necessary static analysis and optimization on the ruleset graph (for instance, by merging identical statement nodes or removing unnecessary dependency links). The partitioning module 1003 computes the cost-optimal (or near cost-optimal if the approximate method is used) partitioning of the ruleset graph. The code generation module 1004 uses the partitioning to generate a stream processing flow, which includes mainly of a set of operators, one per partition. This requires a rule operator (for instance, part of a toolkit of operators such as 1005) that can execute a sub-graph of the ruleset graph on the specific target stream processing platform (such as, for example, 1006).

Additionally, one or more embodiments of the invention can include an implementation for the SPL language, as well as for other stream processing middleware.

Figure 11:
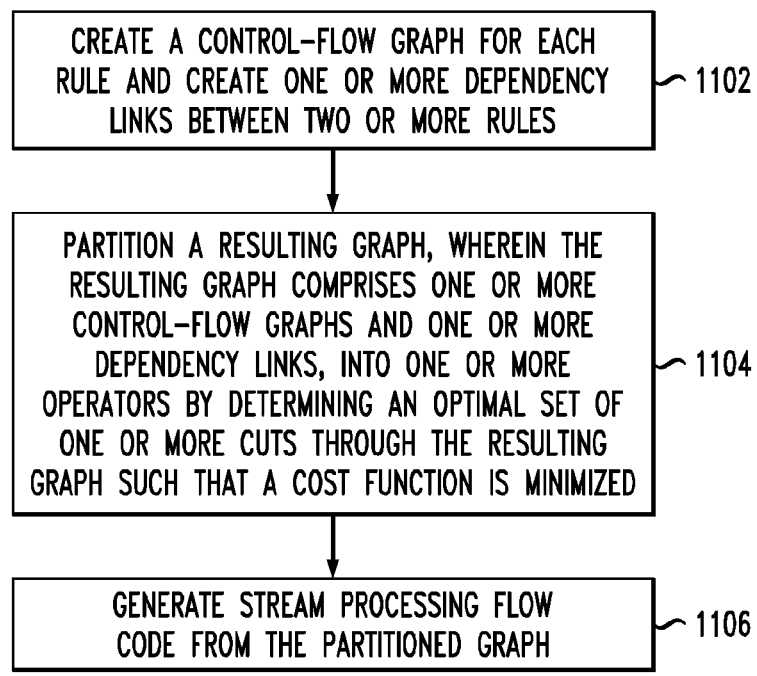
FIG. 11 is a flow diagram illustrating techniques for creating a distributed application flow from a set of rules, according to an embodiment of the invention.

FIG. 11 is a flow diagram illustrating techniques for creating a distributed application flow from a set of rules, according to an embodiment of the present invention. Step 1102 includes creating a control-flow graph for each rule. This step can be carried out, for example, using a ruleset parsing module. Creating a control-flow graph for each rule can include analyzing a set of rules and extracting a dependency graph of computation operators from the set of rules. Step 1102 also includes creating one or more dependency links between two or more rules control flow graphs.

One or more embodiments of the invention additionally include performing an optimization of the ruleset graph resulting from step 1102, for instance, by static analysis techniques such as live variable analysis or constant propagation and constant folding, removing unnecessary dependency links and/or merging identical statements that are not connected by a path in the graph. This step can be carried out, for example, using a static analysis/optimization module.

Step 1104 includes partitioning a resulting graph, wherein the resulting graph comprises one or more control-flow graphs and one or more dependency links, into one or more operators by determining an optimal set of one or more cuts through the resulting graph such that a cost function is minimized. This step can be carried out, for example, using a partitioning module. Determining an optimal set of cuts through the resulting graph can include, for example, creating an equivalent quadratically constrained quadratic program, an equivalent linearly constrained quadratic program or an equivalent integer program, performing an exhaustive search through a set of non-overlapping cuts in a ruleset graph, and/or performing an incremental cut morphing according to a topological sort of the ruleset graph. A cost function can include, for example, a function for one of throughput, latency, computational and memory requirements, an estimated amount of communication between operators, or a combination thereof. Also, a cost function can include a linear, quadratic or an arbitrary cost function.

Also as described herein, determining an optimal set of cuts through the ruleset graph can include formulating the problem as a quadratically constrained quadratic program, a linearly constrained quadratic program or an integer program, or an exhaustive search through the set of non-overlapping cuts in the ruleset graph, or an incremental cut morphing according to a topological sort of the ruleset graph. Also, optimizations can include elimination of unnecessary dependency links between two or more rules based on static analysis and/or theorem proving.

Step 1106 includes generating stream processing flow code (for example, in SPL language) from the partitioned graph. This step can be carried out, for example, using a code generation module.

As detailed herein, the set of rules can include stateless rules and/or stateful rules. Creating dependency links between rules includes, for stateful rules, creating dependency links based on pairing an assert statement a retract statement and/or an update statement in a first rule (for example, A) with a match statement and/or a collect-match statement in a second rule (for example, B) (as such, B depends on A). Additionally, creating dependency links between rules includes, for stateless rules, creating dependency links based on pairing variables set by a first rule (for example, A) and used (in conditions, expressions) by a second rule (for example, B) (as such, B depends on A).

The techniques depicted in FIG. 11 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a ruleset parsing module, a static analysis/optimization module, a partitioning module, and a code generation module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 11 can be implemented via a computer program product that can include computer useable program code that is stored in a computer readable storage medium in a data processing system, and wherein the to computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 12:
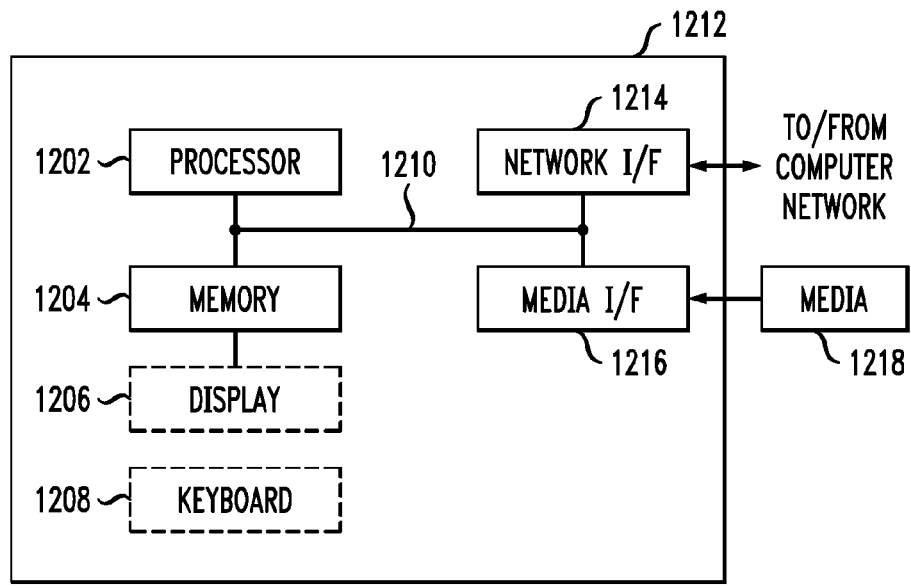
FIG. 12 is a system diagram of an exemplary computer system on which at least one embodiment of the invention can be implemented.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 10. The method steps can then be carried out using the distinct software modules and/or sub-modules of the system, as described above, executing on one or more hardware processors 1202. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, running a set of rules as a distributed program.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for creating a distributed application flow from a set of rules, wherein the method comprises:
    creating a control-flow graph for each rule from the set of rules and creating one or more dependency links between two or more rules from the set of rules, wherein the set of rules comprises at least one of stateless rules and stateful rules;
    partitioning a resulting graph, wherein the resulting graph comprises one or more control-flow graphs and one or more dependency links, into one or more operators by determining an optimal set of one or more cuts through the resulting graph such that a cost function is minimized; and
    generating stream processing flow code from the partitioned graph.

2. The method of claim 1, further comprising performing one or more optimizations on the resulting graph.

3. The method of claim 2, wherein the one or more optimizations comprise at least one of live variable analysis, constant propagation, constant folding and detection and merging of any identical statements on branches of the graph that are not in an ancestor-descendant relation.

4. The method of claim 2, wherein the one or more optimizations comprise elimination of one or more unnecessary dependency links between two or more rules based on at least one of static analysis and theorem proving.

5. The method of claim 1, wherein creating one or more dependency links between two or more rules comprises, for stateful rules, creating one or more dependency links based on pairing at least one of an assert statement a retract statement and an update statement in a first rule with at least one of a match statement and a collect-match statement in a second rule.

6. The method of claim 1, wherein creating one or more dependency links between two or more rules comprises, for stateless rules, creating one or more dependency links based on pairing two or more variables set by a first rule and used by a second rule.

7. The method of claim 1, wherein creating a control-flow graph for each rule comprises analyzing a set of rules and extracting a dependency graph of one or more computation operators from the set of rules.

8. The method of claim 1, wherein a cost function comprises a function for one of throughput, latency, computational and memory requirements, an estimated amount of communication between operators, or a combination thereof.

9. The method of claim 1, wherein a cost function comprises one of a linear cost function, a quadratic cost function and an arbitrary cost function.

10. The method of claim 1, wherein determining an optimal set of one or more cuts through the resulting graph comprises one of creating an equivalent quadratically constrained quadratic program, an equivalent linearly constrained quadratic program or an equivalent integer program, performing an exhaustive search through a set of non-overlapping cuts in a ruleset graph, and performing an incremental cut morphing according to a topological sort of the ruleset graph.

11. The method of claim 1, further comprising providing a system, wherein the system comprises one or more distinct software modules, each of the one or more distinct software modules being embodied on a tangible computer-readable recordable storage medium, and wherein the one or more distinct software modules comprise a ruleset parsing module, a static analysis/optimization module, a partitioning module and a code generation module executing on a hardware processor.

12. A computer program product comprising a non-transitory tangible computer readable recordable storage memory including computer useable program code for creating a distributed application flow from a set of rules, the computer program product including:
  computer useable program code for creating a control-flow graph for each rule from the set of rules and creating one or more dependency links between two or more rules from the set of rules, wherein the set of rules comprises at least one of stateless rules and stateful rules;
  computer useable program code for partitioning a resulting graph, wherein the resulting graph comprises one or more control-flow graphs and one or more dependency links, into one or more operators by determining an optimal set of one or more cuts through the resulting graph such that a cost function is minimized; and
  computer useable program code for generating stream processing flow code from the partitioned graph.

13. The computer program product of claim 12, further comprising computer useable program code for performing one or more optimizations on the resulting graph, wherein the one or more optimizations comprise at least one of live variable analysis, constant folding and detection and merging of any identical statements on branches of the graph that are not in an ancestor-descendant relation.

14. The computer program product of claim 12, wherein the computer useable program code for creating one or more dependency links between two or more rules comprises, for stateful rules, computer useable program code for creating one or more dependency links based on pairing at least one of an assert statement a retract statement and an update statement in a first rule with at least one of a match statement and a collect-match statement in a second rule.

15. The computer program product of claim 12, wherein the computer useable program code for creating one or more dependency links between two or more rules comprises, for stateless rules, computer useable program code for creating one or more dependency links based on pairing two or more variables set by a first rule and used by a second rule.

16. The computer program product of claim 12, wherein a cost function comprises a function for one of throughput, latency, computational and memory requirements, an estimated amount of communication between operators, or a combination thereof.

17. The computer program product of claim 12, wherein the computer useable program code for determining an optimal set of one or more cuts through the resulting graph comprises one of creating an equivalent quadratically constrained quadratic program, an equivalent linearly constrained quadratic program or an equivalent integer program, performing an exhaustive search through a set of non-overlapping cuts in a ruleset graph, and performing an incremental cut morphing according to a topological sort of the ruleset graph.

18. A system for creating a distributed application flow from a set of rules, comprising:
  a memory; and
  at least one processor coupled to the memory and operative to:
    create a control-flow graph for each rule from the set of rules and creating one or more dependency links between two or more rules from the set of rules, wherein the set of rules comprises at least one of stateless rules and stateful rules;
    partition a resulting graph, wherein the resulting graph comprises one or more control-flow graphs and one or more dependency links, into one or more operators by determining an optimal set of one or more cuts through the resulting graph such that a cost function is minimized; and
    generate stream processing flow code from the partitioned graph.

19. The system of claim 18, wherein the at least one processor coupled to the memory is further operative to perform one or more optimizations on the resulting graph, wherein the one or more optimizations comprise at least one of live variable analysis, constant folding and detection and merging of any identical statements on branches of the graph that are not in an ancestor-descendant relation.

20. The system of claim 18, wherein the at least one processor coupled to the memory operative to create one or more dependency links between two or more rules is further operative to, for stateful rules, create one or more dependency links based on pairing at least one of an assert statement a retract statement and an update statement in a first rule with at least one of a match statement and a collect-match statement in a second rule.

21. The system of claim 18, wherein the at least one processor coupled to the memory operative to create one or more dependency links between two or more rules is further operative to, for stateless rules, create one or more dependency links based on pairing two or more variables set by a first rule and used by a second rule.

22. The system of claim 18, wherein a cost function comprises a function for one of throughput, latency, computational and memory requirements, an estimated amount of communication between operators, or a combination thereof.

* * * * *